(12) United States Patent
Adams et al.

(10) Patent No.: US 10,379,256 B2
(45) Date of Patent: Aug. 13, 2019

(54) COMBINED SEISMIC AND ELECTROMAGNETIC SURVEY CONFIGURATIONS

(71) Applicant: PGS Geophysical AS, Oslo (NO)

(72) Inventors: Robert James Adams, West Perth (AU); Barrett Moreing Cameron, West Perth (AU); Andrew Samuel Long, West Perth (AU)

(73) Assignee: PGS Geophysical AS, Oslo (NO)

( * ) Notice: Subject to any disclaimer, the term of this patent is extended or adjusted under 35 U.S.C. 154(b) by 0 days.

(21) Appl. No.: 15/333,038

(22) Filed: Oct. 24, 2016

(65) Prior Publication Data

US 2017/0176636 A1 Jun. 22, 2017

Related U.S. Application Data

(60) Provisional application No. 62/268,330, filed on Dec. 16, 2015.

(51) Int. Cl.
*G01V 1/38* (2006.01)
*G01V 3/165* (2006.01)
*G01V 11/00* (2006.01)
*G01V 3/08* (2006.01)

(52) U.S. Cl.
CPC ............ *G01V 11/00* (2013.01); *G01V 1/3808* (2013.01); *G01V 3/165* (2013.01); *G01V 1/3843* (2013.01); *G01V 3/083* (2013.01)

(58) Field of Classification Search
CPC ...... G01V 1/3808; G01V 3/165; G01V 11/00; G01V 1/3843; G01V 3/083
USPC .......................................................... 367/15
See application file for complete search history.

(56) References Cited

U.S. PATENT DOCUMENTS

| 4,617,518 | A | 10/1986 | Smka | |
|---|---|---|---|---|
| 6,026,059 | A | 2/2000 | Starr | |
| 7,328,107 | B2* | 2/2008 | Strack | G01V 11/00 |
| | | | | 702/14 |
| 7,415,936 | B2* | 8/2008 | Storteig | B63L 321/66 |
| | | | | 114/242 |
| 7,453,763 | B2 | 11/2008 | Johnstad | |

(Continued)

FOREIGN PATENT DOCUMENTS

| CN | 104280781 A | * | 1/2015 |
|---|---|---|---|
| CN | 104280781 A | | 1/2015 |
| WO | 2012053902 A1 | | 4/2012 |

OTHER PUBLICATIONS

"Terraquaphone," Maynard, Electronics Illustrated, vol. 4, No. 7, Sep. 1961, downloaded Feb. 12, 2018 from www.americanradiohistory.com, pp. 41-44.*

(Continued)

*Primary Examiner* — Daniel L Murphy
(74) *Attorney, Agent, or Firm* — Patterson + Sheridan, LLP

(57) ABSTRACT

A method and apparatus for marine surveying including towing an electromagnetic source having an electromagnetic cross-talk zone and an entanglement zone; towing a plurality of pieces of seismic equipment, wherein each piece of seismic equipment is towed outside of the electromagnetic cross-talk zone and the entanglement zone; actuating the electromagnetic source; and while actuating the electromagnetic source, acquiring seismic survey data with the plurality of pieces of seismic equipment.

20 Claims, 13 Drawing Sheets

(56) References Cited

U.S. PATENT DOCUMENTS

| | | |
|---|---|---|
| 7,567,084 B2 | 7/2009 | Eidesmo et al. |
| 7,912,649 B2 | 3/2011 | Harris et al. |
| 8,004,930 B2 | 8/2011 | Welker et al. |
| 8,060,314 B2 | 11/2011 | Welker |
| 8,077,542 B2 | 12/2011 | Gulbransen et al. |
| 8,098,542 B2 | 1/2012 | Hillesund et al. |
| 8,148,990 B2 | 4/2012 | Helwig et al. |
| 8,183,868 B2 | 5/2012 | Summerfield et al. |
| 8,467,264 B2 | 6/2013 | Keers et al. |
| 8,582,394 B2 | 11/2013 | Sudow et al. |
| 8,730,760 B2 | 5/2014 | Gambols et al. |
| 8,897,094 B2 | 11/2014 | Eick et al. |
| 8,976,622 B2 | 3/2015 | Hillesund et al. |
| 9,176,254 B2 | 11/2015 | Johnstad |
| 9,217,806 B2 | 12/2015 | Peppe et al. |
| 2007/0294036 A1 | 12/2007 | Strack et al. |
| 2010/0045295 A1 | 2/2010 | Mittet et al. |
| 2010/0103771 A1 | 4/2010 | Gulbransen et al. |
| 2010/0142317 A1 | 6/2010 | Moldoveanu et al. |
| 2010/0280773 A1 | 11/2010 | Saether |
| 2011/0108283 A1 | 5/2011 | Smka et al. |
| 2011/0158043 A1 | 6/2011 | Johnstad |
| 2012/0081995 A1 | 4/2012 | Hillesund et al. |
| 2012/0230150 A1 | 9/2012 | Sudow et al. |
| 2012/0250457 A1 | 10/2012 | Rickert, Jr. et al. |
| 2013/0272090 A1 | 10/2013 | Peppe et al. |
| 2014/0121977 A1* | 5/2014 | Lecocq ............... G01V 1/38 702/11 |
| 2014/0167768 A1 | 6/2014 | Linfoot et al. |
| 2014/0254316 A1 | 9/2014 | Tenghamn |
| 2014/0269168 A1 | 9/2014 | Ursin et al. |
| 2014/0355379 A1 | 12/2014 | Moldoveanu et al. |
| 2015/0016217 A1 | 1/2015 | Hillesund et al. |
| 2015/0138919 A1 | 5/2015 | Hillesund et al. |
| 2015/0293242 A1 | 10/2015 | Hegna et al. |
| 2015/0369945 A1 | 12/2015 | Drange |

OTHER PUBLICATIONS

International Search Report and Written Opinion for Application No. PCT/EP2016/078865 dated Feb. 16, 2017.

* cited by examiner

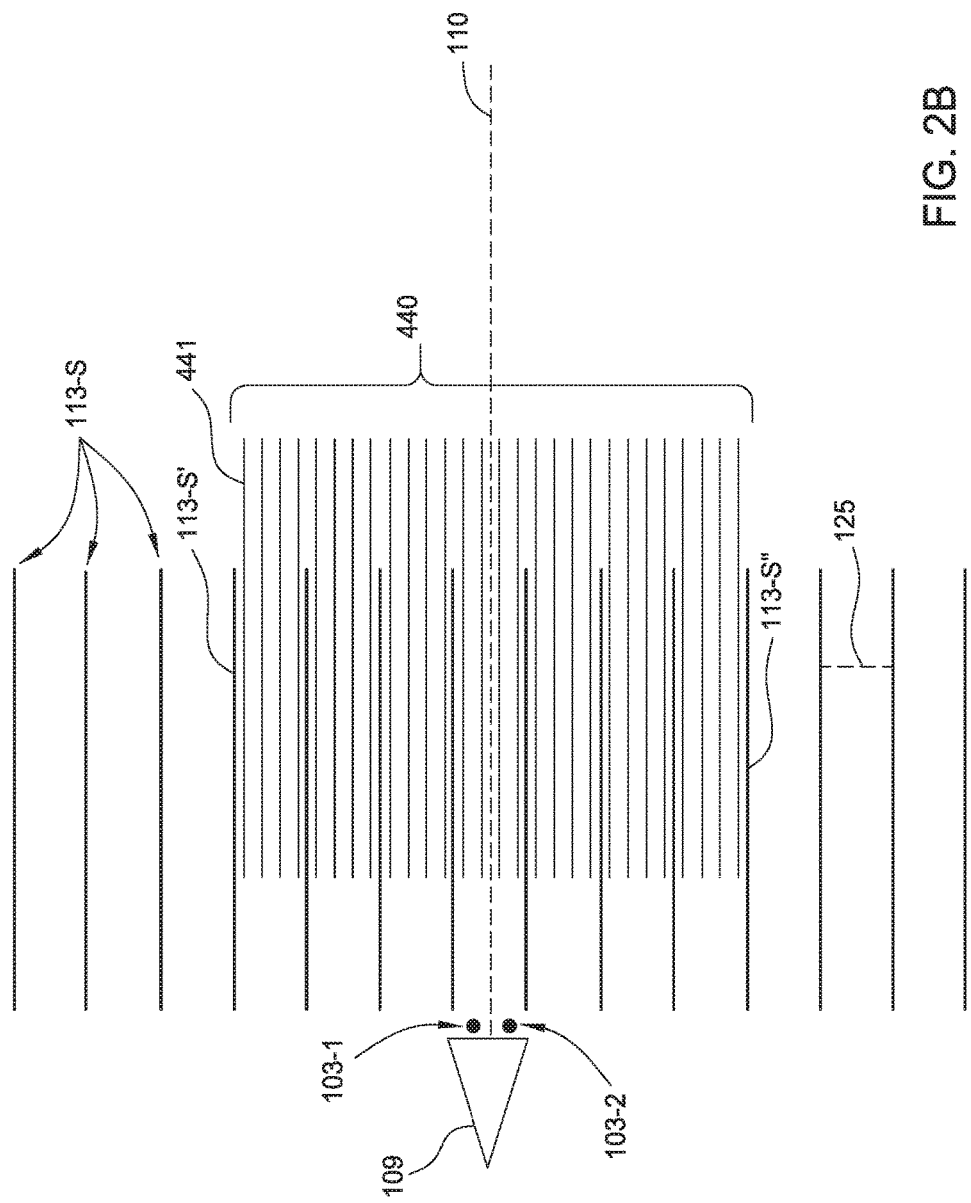

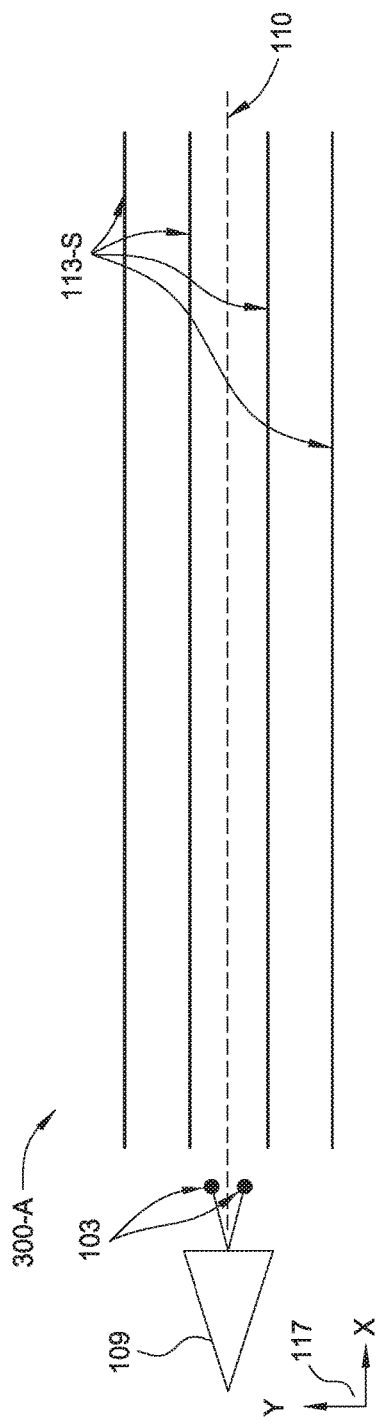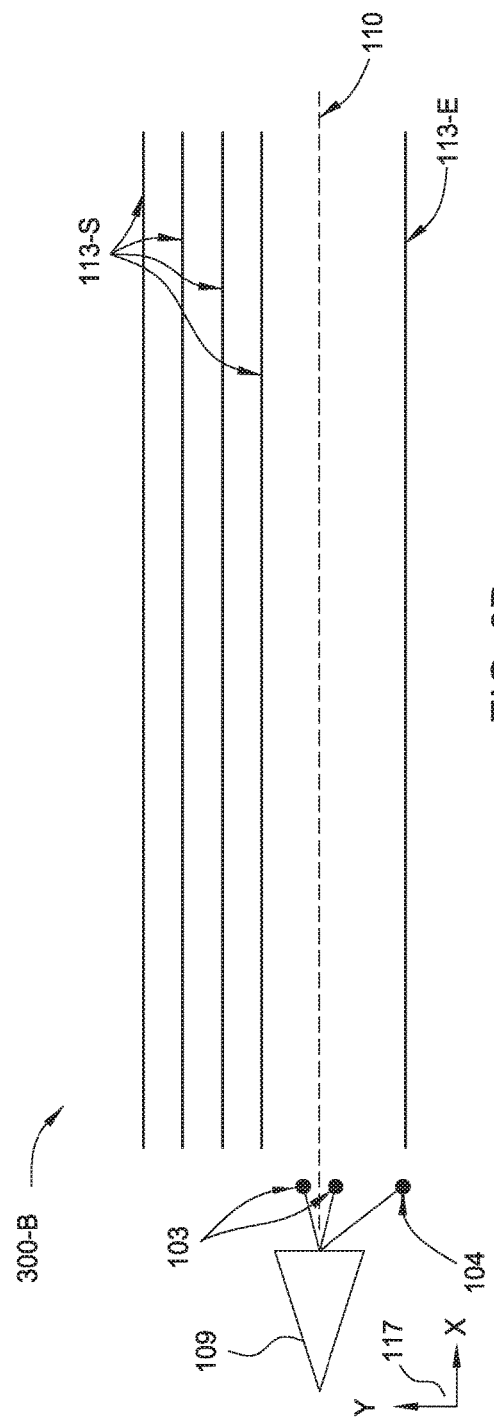

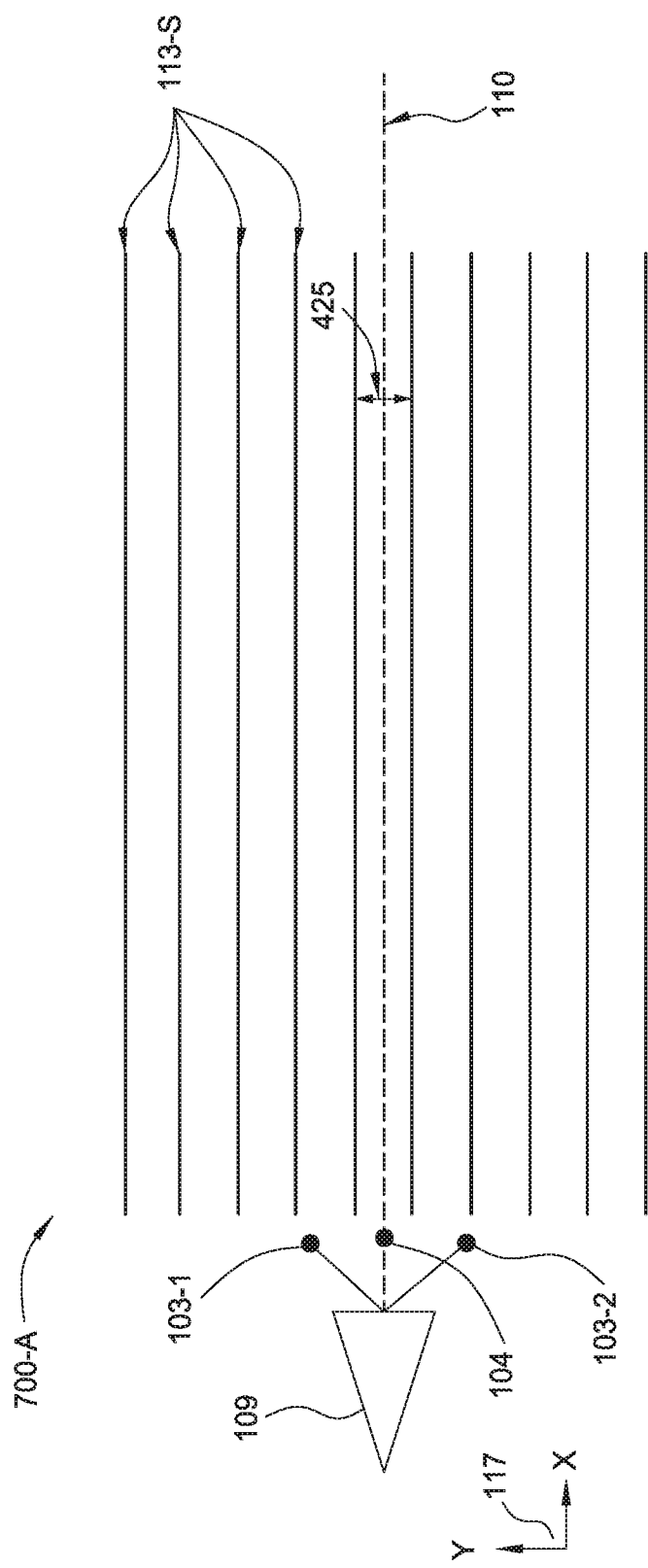

COMBINED SEISMIC AND ELECTROMAGNETIC SURVEY CONFIGURATIONS

CROSS REFERENCE TO RELATED APPLICATIONS

This application claims benefit of U.S. Provisional Patent Application Ser. No. 62/268,330, filed Dec. 16, 2015, entitled "Combined Towed Seismic Streamer and Towed EM Streamer Configurations For One Vessel," which is incorporated herein by reference.

BACKGROUND OF THE INVENTION

This disclosure is related generally to the field of marine surveying. Marine surveying can include, for example, seismic and/or electromagnetic (EM) surveying, among others. For example, this disclosure may have applications in marine surveying in which one or more sources are used to generate energy (e.g., wavefields, pulses, signals), and receivers—either towed or ocean bottom—receive energy generated by the sources and possibly affected by interaction with subsurface formations. Towed receivers may be disposed on cables referred to as streamers. The receivers thereby collect survey data which can be useful in the discovery and/or extraction of hydrocarbons from subsurface formations.

Recent efforts have been made to simultaneously conduct marine seismic surveys and marine EM surveys, while other recent efforts have been made to conduct marine EM surveys with towed EM receivers. Technical complexities and operational considerations have been appreciated only through such recent efforts. For example, the proximity of EM sources to seismic equipment may create EM cross-talk, impeding survey operations and/or creating noise in the survey data. For example, EM cross-talk may occur when a signal generated by an EM source causes an undesired effect in circuits of seismic equipment. Additionally, entanglement may occur between seismic equipment and EM equipment, including tow lines, lead-in lines, air lines, umbilical, spreaders, etc. New survey configurations for combined seismic and EM survey configurations would be beneficial.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2B illustrates a marine surveying system, showing an aspect of common midpoint analysis.

FIG. 3A is a top-view of a marine surveying system. FIG. 3B is a top-view of another marine surveying system.

FIG. 7A is a top-view of a marine surveying system.

DETAILED DESCRIPTION

Figure 1A:
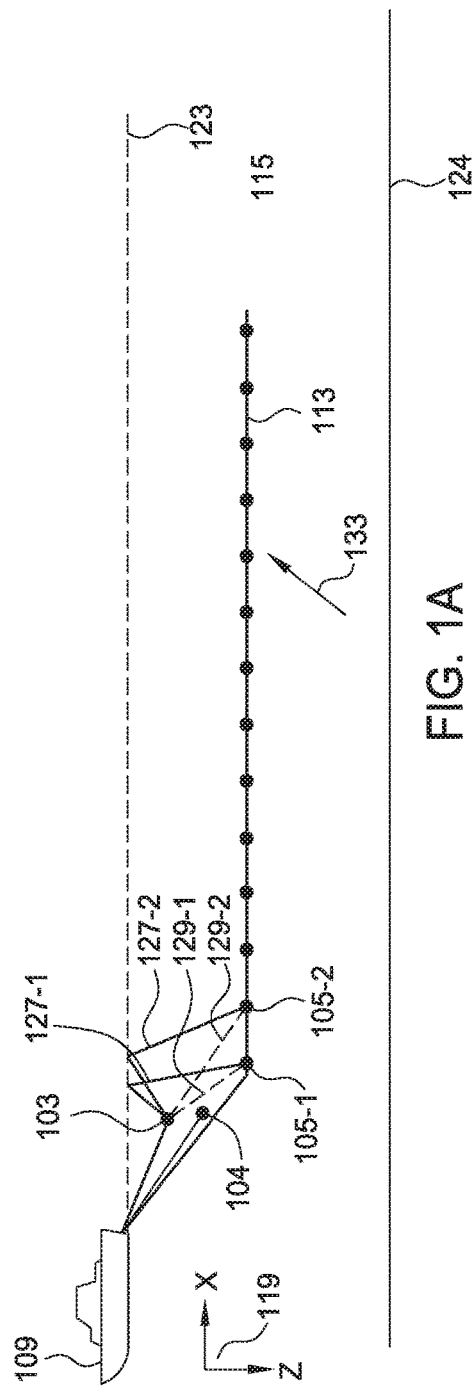
FIG. 1A is a side-view of a marine surveying system.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects. The term "uniform" means substantially equal for each sub-element, within about +−10% variation. The term "nominal" means as planned or designed in the absence of variables such as wind, waves, currents, or other unplanned phenomena. "Nominal" may be implied as commonly used in the field of marine surveying.

"Cable" shall mean a flexible, axial load carrying member that also comprises electrical conductors and/or optical conductors for carrying electrical power and/or signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

"Forward" or "front" shall mean the direction or end of an object or system that corresponds to the intended primary direction of travel of the object or system.

"Aft" or "back" shall mean the direction or end of an object or system that corresponds to the reverse of the intended primary direction of travel of the object or system.

"Port" and "starboard" shall mean the left and right, respectively, direction or end of an object or system when facing in the intended primary direction of travel of the object or system.

"Obtaining" data shall mean any method or combination of methods of acquiring, collecting, or accessing data, including, for example, directly measuring or sensing a physical property, receiving transmitted data, selecting data from a group of physical sensors, identifying data in a data record, and retrieving data from one or more data libraries.

As used herein, "seismic equipment" shall mean seismic sources, seismic receivers, seismic streamers, birds, floats, guns, vibrators, and other equipment typically disposed on/with/around a seismic source or a seismic streamer, but not towing lines or other equipment normally disposed between a survey vessel and a source or streamer.

If there is any conflict in the usages of a word or term in this specification and one or more patent or other documents that may be incorporated herein by reference, the definitions that are consistent with this specification should be adopted for the purposes of understanding this invention.

The present invention generally relates to marine survey methods and apparatuses, and, at least in some embodiments, to novel combined seismic and electromagnetic (EM) survey apparatus, and their associated methods of use.

One of the many potential advantages of the embodiments of the present disclosure is that combined seismic and EM surveys may be conducted with lessened risks of EM cross-talk and/or entanglement between the EM source and the seismic equipment. Another potential advantage includes conducting combined seismic and EM surveys that have nominally uniform common midpoint (CMP) coverage, but that do not require multiple acquisition path passes over the same area of a subsurface formation (i.e., do not require interleaved survey design). Embodiments of the present disclosure can thereby be useful in the discovery and/or extraction of hydrocarbons from subsurface formations.

Figure 1B:
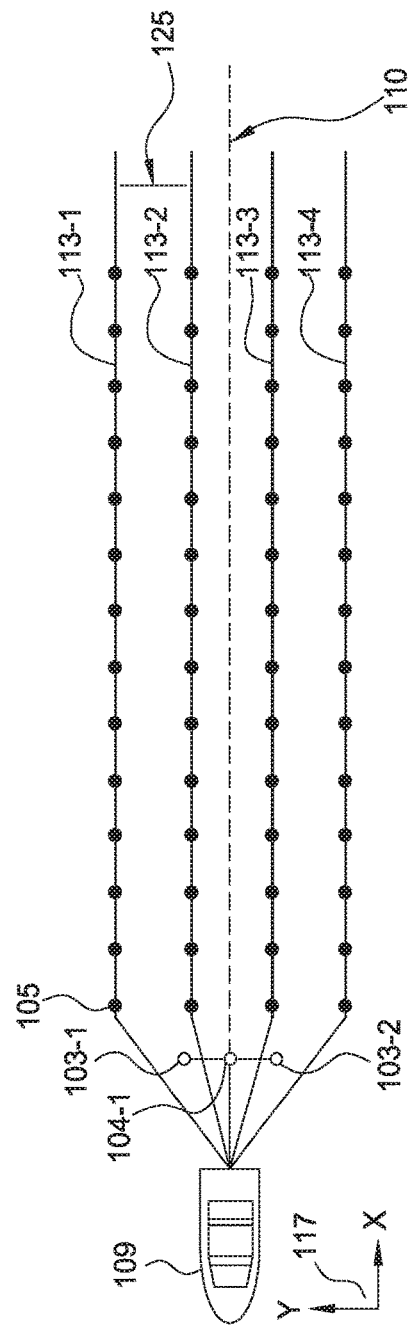
FIG. 1B is a top-view of the marine surveying system.

FIGS. 1A-1B illustrate coordinates and terminology associated with marine surveying according to one or more embodiments of the present disclosure. FIG. 1A illustrates an elevation or xz-plane 119 view of an example survey vessel 109 towing a seismic source 103, an EM source 104, and a streamer 113, located in a body of water 115. In various embodiments, the seismic source 103 can include one or more air guns and/or marine vibrators, among other common seismic sources, as source elements. In various embodiments, the EM source 104 can include one or more electric dipoles or magnetic loops, among other common EM sources, as source elements. As would be understood by one of ordinary skill in the art with the benefit of this disclosure, EM source 104 may be made up of a pair of electrodes, separated in some instances by several hundred meters, or by as much as 800 m or more. It is believed that a larger separation between the two source electrodes will produce a stronger current in the subsurface formation. In the figures, EM source 104 (or EM source element 104-$n$) essentially corresponds to the location of the forward source (or source element) electrode. The aft source (or source element) electrode will typically be located directly behind (in the inline or x-direction) the forward electrode. Since the risks of EM cross-talk and/or entanglement primarily come from the forward end of the EM source, the figures, for simplicity, only illustrate the location of the forward source (or source element) electrode at the location of EM source 104. Typically, the forward electrode of EM source 104 (or EM source element 104-$n$) will be between about 150 m and about 300 m behind survey vessel 109. In various embodiments, streamer 113 may include one or more seismic receivers and/or one or more EM receivers. In practice, seismic source 103, EM source 104, and streamer 113 may be towed by the same or different vessels. Seismic source 103 may be towed at the same or a different depth than EM source 104. In some embodiments, seismic source 103 may be towed between 1 m and 20 m depth. In some embodiments, seismic source 103 may be towed between 5 m and 10 m depth. In some embodiments, seismic source 103 may be towed at about 7 m depth. In some embodiments, EM source 104 may be towed between 1 m and 200 m depth. In some embodiments, EM source 104 may be towed between 50 m and 150 m depth. In some embodiments, EM source 104 may be towed at about 100 m depth.

Associated with each EM source 104 (or EM source element 104-$n$) is an EM cross-talk zone and an entanglement zone. An EM cross-talk zone may be thought to be a spherical volume surrounding the forward source (or source element) electrode of an EM source (or source element). The radius of the spherical volume corresponds to a distance at which the expected strength of the EM field has dropped sufficiently for the risks of EM cross-talk in seismic equipment to be within an acceptable limit. For example, for an EM source used in a typical survey, the EM cross-talk zone could have a radius of 150 m, meaning that notable cross-talk from the EM source into the seismic data would occur if one of the source electrodes is closer than 150 m to a seismic sensor such as a hydrophone. In some embodiments, the EM cross-talk zone may have a radius of as low as 300 m, while in some embodiments the EM cross-talk zone may have a radius of as low as 200 m, while in some embodiments the EM cross-talk zone may have a radius of as low as 100 m. An entanglement zone may be thought to be a conical volume with an apex at the coupling of the EM source to the survey vessel, a height measured between the coupling of the EM source to the survey vessel and the location of the forward source (or source element) electrode while the EM source is being towed, and a base radius corresponding to a distance at which the expected risks of entanglement of the EM source with the seismic equipment are within an acceptable limit. In a typical survey, the entanglement zone can be an elliptical cone wherein the height of the cone is the same as described for the conical volume, and the base of the elliptical cone is generally perpendicular to the towing direction with a lateral axis and a vertical axis. In a typical survey, the vertical axis could be 15 m and the lateral axis could be 50 m. In some embodiments, the entanglements zone may have a lateral axis as low as 300 m, while in some embodiments the entanglement zone may have a lateral axis as low as 200 m, while in some embodiments the entanglement zone may have a lateral axis as low as 100 m. The vertical axis can be equal to the lateral axis, or greater or smaller.

FIG. 1B includes xy-plane 117, and FIG. 1A includes an xz-plane 119 of the same Cartesian coordinate system used to specify coordinate locations within the body of water and subsurface formation with respect to three orthogonal, spatial coordinate axes labeled x, y and z. The x coordinate uniquely specifies the position of a point in a direction parallel to the path of travel of the survey vessel 109 at a particular point in time (referred to herein as the inline direction), the y coordinate uniquely specifies the position of a point in a direction perpendicular to the x axis and substantially parallel to the surface 123 of the body of water 115 at survey vessel 109 (referred to herein as the crossline direction), and the z coordinate uniquely specifies the position of a point perpendicular to the xy-plane. The inline separation (or "inline offset") between elements is measured in the x-direction; the crossline separation (or "crossline offset") between elements is measured in the y-direction, and the depth separation between elements is measured in the z-direction. The total separation (or "total offset", or "offset") can thus be expressed as a function of the three separation components. The surface 123 is the hypothetical surface of the sea level at survey vessel 109 and is used to define zero elevation (i.e., z=0). Shaded disks, such as shaded disks 105-1 and 105-2, represent receivers spaced along streamer 113. Receivers 105 can include, for instance, seismic receivers and/or EM receivers, among others. Although illustrated on a towed streamer 113, the receivers 105 may be located on a number of ocean bottom cables and/or nodes (OBCN) attached near or on the bottom 124 of body of water 115. Receivers 105 are configured to detect energy originating from seismic source 103 and/or EM source 104.

FIG. 1A includes an illustration of a shot (i.e., actuation of a source) and outgoing wave routes 129-1, 129-2 from the seismic source 103 at a corresponding number of receivers

105-1, 105-2. Also illustrated at the corresponding number of receivers 105-1, 105-2 is arrival of a corresponding number of reflected wave routes 127-1, 127-2 from the seismic source 103 reflected off the surface 123 of the body of water 115. Up-going wave route 133 illustrates energy that traveled from seismic source 103 into the subsurface formation below the bottom 124 of body of water 115, changing direction due to interaction with rocks, materials, or geological structures in the subsurface formation.

FIG. 1B illustrates a top or xy-plane 117 view of the survey vessel 109 towing a seismic source 103 with seismic source elements 103-1, 103-2, an EM source with one source element 104-1, and four separate streamers 113-1, 113-2, 113-3, 113-4 located beneath a surface 123 of body of water 115. An array of streamers is referred to as a "streamer spread". The crossline separation between adjacent streamers is referred to as streamer separation 125. In the illustrated embodiment, the nominal streamer separation 125 between each adjacent streamer pair is equal (uniform), while other embodiments may have unequal nominal spacing between adjacent streamers (non-uniform or irregular). The midline 110 represents the tow path along the centerline of the survey vessel 109, extending behind the survey vessel to the farthest element of the survey, for example the most distal point of the longest streamer 113. When straight-line towing, the nominal path of the streamers 113 (without disturbance by cross currents, etc.) parallels the midline 110. The midline defines y=0. Embodiments are not limited to two source elements in a seismic source, as a seismic source can include more or fewer source elements. Some embodiments can, for example, include 35 source elements in the seismic source. Furthermore, the seismic source can be one-dimensional (e.g., arranged in a line as shown), two-dimensional (e.g., arranged in a rectangular grid), or three-dimensional (e.g., arranged in a cube), which can be termed an array of source elements or a source array. The seismic source can comprise one or several source elements, such as air guns or vibrators, towed at one or more depths, and can be suspended from one or more floats at the surface. The three-dimensional sources can have any of a variety of spatial configurations.

Embodiments are not limited to a particular number of streamers and can include more or fewer than are shown in FIG. 1B. Some embodiments can, for example, include 24 or more streamers. As illustrated, the streamers 113-1, 113-2, 113-3, 113-4 can be modeled as a planar horizontal acquisition surface located beneath the surface 123 of body of water 115. However in practice, the acquisition surface can be smoothly varying due to active sea currents and/or weather conditions. In other words, the towed streamers may also undulate as a result of dynamic conditions of the fluid. The coordinates of a particular receiver are given by (x, y, z) taking into account both the xz-plane 119 and the xy-plane 117. In some embodiments, the streamer array may vary in the z direction. For example, streamers may be slanted such that receivers disposed farther from the survey vessel may be deeper than those closer to the survey vessel. Other examples include combination of horizontal and slanted depth profiles, sinusoidal depth profiles, and "snake" depth profiles. Likewise, in some embodiments, one or more of the streamers may be towed at a different depth than other streamers, thereby creating an acquisition volume.

Although not illustrated, the survey vessel 109 may include equipment, referred to herein generally as a "recording system", that may provide and/or include navigation control, navigation monitoring, including position determination, seismic source control, seismic source monitoring, receiver control, receiver monitoring, survey data recording, time monitoring, and/or time synchronization between the various control, monitoring, and/or recording elements.

Although FIGS. 1A and 1B illustrate horizontal and/or straight-line towing, examples of the present disclosure may include circular towing and/or spiral towing, among other patterns. Although FIGS. 1A and 1B illustrate a single survey vessel 109, a plurality of vessels may be present, with some or all of the vessels towing streamers and some or all of the vessels actuating sources. The streamers may be towed in different directions, depths, and/or angles, among other differences. While towing EM source 104 from a different vessel than survey vessel 109 may reduce entanglement risks, EM cross-talk risks would remain unchanged. Although FIGS. 1A and 1B illustrate streamers that are parallel to the x-axis, the streamers may diverge somewhat from parallel (for example, streamer fanning may progressively increase the crossline separation between two adjacent streamers as distance from the survey vessel increases).

Data acquisition in accordance with one or more embodiments of the present disclosure may be applicable to a plurality of data acquisition operations, including actuating sources (seismic, electromagnetic, etc.) and/or detecting energy with receivers (located on towed streamers, OBCN, among other implementations). In embodiments utilizing ocean bottom nodes, towed sources can be actuated and the resultant energy can be detected with nodal data receivers positioned on or near the water bottom. In embodiments utilizing ocean bottom cables, towed sources can be actuated and the resultant energy can be detected with receivers spaced along the ocean bottom cable. Signals generated by the receivers, indicative of the detected energy, environmental conditions, and/or positing information, can be recorded by a recording unit for later retrieval and/or processing.

Each seismic receiver can detect pressure and/or particle motion in the water and/or can be responsive to changes in the pressure and/or particle motion with respect to time. The seismic receivers can include hydrophones, geophones, pressure sensors, particle motion sensors, among other types of seismic sensors, and/or combinations thereof. Seismic survey data may be acquired when a seismic source is actuated, energy travels from the seismic source into the subsurface formation, and then the resultant energy is detected by one or more seismic receivers. The energy detected by a seismic receiver thus originates from the seismic source.

Each EM receiver can detect an electromagnetic field in the water and/or can be responsive to changes in the electromagnetic field with respect to time. The EM receivers can include electrode pairs, magnetic loops, among other types of EM sensors, and/or combinations thereof. EM survey data may be acquired when an EM source is actuated, energy travels from the EM source into the subsurface formation, and then the resultant energy is detected by one or more EM receivers. The energy detected by an EM receiver thus originates from the EM source.

In order to produce an image of the subsurface formation, the acquired survey data can be processed. One example approach includes performing a direct imaging of seismic data using a Separated Wavefield IMaging (SWIM™) analysis and processing approach. For instance, both up-going and down-going wavefields detected by a receiver can be used to yield seismic images based upon surface multiples. This can provide complementary and useful images at a plurality of target depths. Shallow geophysical analysis may be possible, for example, even in areas of very shallow water. Deep imaging around and/or below salt bodies and other complex geology may be improved, particularly for multi-vessel survey scenarios, including wide-azimuth, full-azimuth, etc. Incorporation of surface multiples into the imaging process can also improve subsurface illumination, in a number of examples.

Figure 2A:
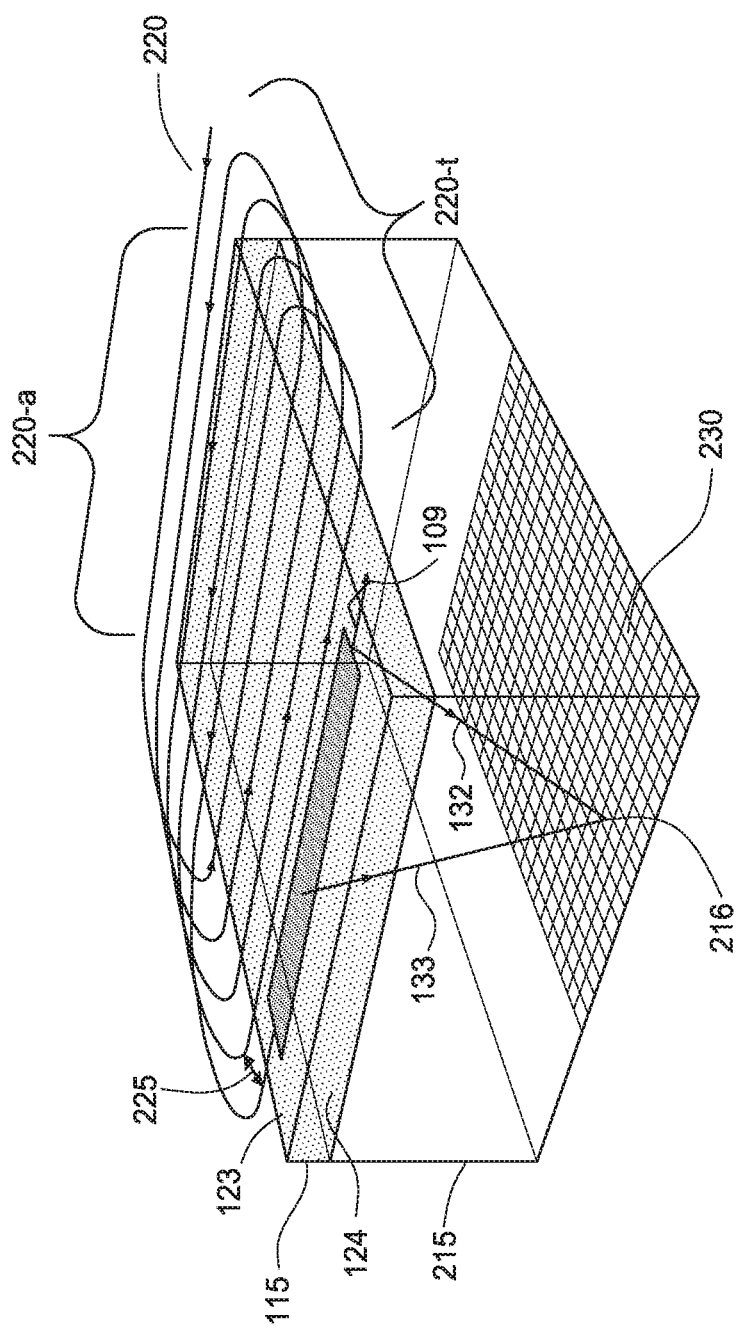
FIG. 2A illustrates a marine survey, showing an aspect of common midpoint analysis.

FIG. 2 illustrates a survey vessel 109 conducting a marine survey according to a "race-track" survey design. Survey vessel 109 is shown following a path of travel 220. The path of travel 220 includes straight-line portions, acquisition paths 220-a, wherein survey data acquisition may occur. The path of travel 220 also includes curved portions, turn paths 220-t, wherein the survey vessel turns between acquisition paths, and wherein survey data acquisition may not occur. Typically, the acquisition paths 220-a would be parallel, and adjacent acquisition paths 220-a would be equally spaced apart throughout the entire survey area. The crossline separation 225 between adjacent acquisition paths 220-a (the sail-line separation) is related to the crossline extent of the streamer array and the density of survey data desired. For uniform streamer separation and uniform nominal sail-line separation:

$$\text{Sail-line separation} = 0.5 \times N_{streamers} \times \text{streamer separation} \quad (1)$$

As illustrated, the survey vessel 109 travels in one direction on four adjacent acquisition paths 220-a, and in the opposite direction on the next four adjacent acquisition paths 220-a. Each set of adjacent acquisition paths with a common shooting direction is referred to as a "swath".

Alternative survey designs may include paths of travel such that the survey vessel travels in a first direction on an acquisition path, in the opposite direction on the immediately adjacent acquisition path, in the first direction on the next acquisition path, and so on, such that each acquisition path is in the opposite direction to its immediate neighbors (no swaths). Such survey design is referred to as "anti-parallel" or "herringbone".

As would be understood by one of ordinary skill in the art with the benefit of this disclosure, other applicable survey designs provide acquisition paths 220-a that are not straight lines, for example, circular towing and/or spiral towing. In some instances, such survey designs may minimize the time the survey vessel 109 spends not acquiring survey data. For simplicity, the following discussion focuses on straight-line acquisition paths 220-a. Common methods for marine surveying and data processing may be used to adapt the following discussion to non-straight-line procedures.

FIG. 2 also illustrates survey vessel 109 traveling through body of water 115 above subsurface formation 215. A seismic source (not shown) towed by survey vessel 109 generates energy that follows one exemplary down-going wave route 132 through body of water 115 and into subsurface formation 215. As illustrated, the energy intersects a reflector 216 in the subsurface formation 215, causing the energy to propagate along up-going wave route 133. Reflector 216 may be, for example, an interface between geological structures. Binning grid 230 is modeled at the depth of reflector 216. Although the subsurface geology is rarely flat, common data processing techniques may model interfaces as flat (uniform depth) for at least a portion of the calculations. Generally, the size of the bins is determined based on the desired resolution of the resulting picture of the subsurface formation. By considering all possible wave routes from all available seismic source-receiver pairs, the associated seismic trace from each seismic source-receiver pair may be determined. Typically, each bin of binning grid 216 may contain about 60 traces. The "fold" of a survey refers to the number of traces per bin. A single common midpoint may be determined where the survey data from the receivers may be stacked to maximize the fold. More particularly, the dimensions of each bin are related to the inline receiver separation along the streamers (typically about 12.5 m), and the crossline streamer separation (125 in FIG. 1B). The dimensions of each bin are also related to the number of seismic sources being utilized (e.g., firing one source for "single-source shooting", or firing two sources in an alternating manner for "dual-source shooting"). The crossline bin width is given by:

$$\text{Crossline bin width}_{single\ source} = 0.5 \times \text{streamer separation} \quad (2)$$

for single-source shooting, and $$\text{Crossline bin width}_{dual\ source} = 0.25 \times \text{streamer separation} \quad (3)$$

for dual-source shooting. Smaller bin dimensions correspond to higher survey data density, and consequently higher resolution of the resulting picture of the subsurface formation.

In some embodiments, higher resolution may be achieved by "interleaved" survey design, wherein survey data is first acquired in a typical manner and then survey data is acquired where every acquisition path 220-a is shifted in the crossline direction by a distance given by:

$$\text{Shift} = 0.125 \times \text{streamer separation} \quad (4)$$

The survey vessel 109 makes two acquisition path passes over each portion of the area to be surveyed. The two datasets may be combined onto a single binning grid with bin width given by:

$$\text{Crossline bin width}_{interleaved} = 0.125 \times \text{streamer separation} \quad (5)$$

rather than Equation (3). Marine surveying with an interleaved survey design is more expensive than with a non-interleaved survey design, due to doubling the amount of time the survey vessel spends to acquire the data.

The center of each bin in binning grid 230 is referred to as the "Common Midpoint" (CMP). Using the flat geology assumption, the location of each subsurface reflection point is at a midpoint between the respective source and receiver coordinates for each wave route. For example, a source-receiver pair that includes a receiver 105 close to the survey vessel 109 on streamer 113 will have a CMP with an x-coordinate close to that of the seismic source 103. Alternatively, a source-receiver pair that includes a receiver 105 farther from the survey vessel 109 on streamer 113 will have a CMP with a larger x-coordinate than the seismic source 103. The angle between the midline 110 and the line between the source and the receiver is known as the "azimuth", wherein azimuth=0° when the receiver has the same y-coordinate as the source.

Using the flat geology assumption, the survey configuration determines predicted (or nominal) CMP sublines, as illustrated in FIG. 2B. The area where the CMP sublines are uniformly distributed for a given acquisition path 220-a may be referred to as an area or extent of uniform CMP coverage 440. A marine survey may be designed to "tile" areas of uniform CMP coverage from adjacent acquisition paths 220-s so that the entire marine survey area will be uniformly covered. Interleaved survey design may be utilized to fully tile the marine survey area when the crossline extent of uniform CMP coverage 440 is noncontiguous. Note in FIG. 2B that four CMP sublines fall between, rather than overlap, pairs of adjacent seismic streamers 113-S. For example, CMP subline 441 is closer to midline 110 than seismic streamer 113-S'. The extent of uniform CMP coverage 440 is, therefore, less than the sum of the streamer separations 125 between seismic streamer 113-S' and seismic streamer 113-S". However, to tile the area for uniform CMP coverage, the next CMP subline does not need to overlap CMP subline 441 or even seismic streamer 113-S', but rather needs only to fall on the opposite side of seismic streamer 113-S', an equal distance away as CMP subline 441.

FIG. 3A illustrates a survey configuration 300-A. For simplicity of discussion, this illustration shows only relevant elements of the survey configuration 300-A. As would be understood by one of ordinary skill in the art with the benefit of this disclosure, standard towing equipment (such as paravanes, spreaders, deflectors, tow lines, lead-in cables, air lines, umbilicals, lateral force and depth control devices, tail buoys, etc.) are not illustrated, but should be assumed to be utilized according to common practice. Likewise, additional vessels may be used to tow the illustrated elements while maintaining the survey configuration. Survey configuration 300-A illustrates survey vessel 109 towing seismic streamers 113-S (i.e., streamers having only seismic receivers) equally distributed on both sides of the midline 110. In some embodiments, the length of seismic streamers 113-S may be between about 3 km and about 12 km, and the distance between the outer-most seismic streamers 113-S (or "width of streamer spread" or "crossline extent of streamer array") may be between about 300 m and about 2000 m. The inline distance between survey vessel 109 and the forward end of seismic streamers 113-S may be between about 200 and about 500 m or more. In some embodiments, seismic streamers 113-S may be towed between 1 m and 100 m depth. In some embodiments, seismic streamers 113-S may be towed between 10 m and 50 m depth. In some embodiments, seismic streamers 113-S may be towed between 20 m and 30 m depth. In some embodiments, seismic streamers 113-S may be towed at about 25 m depth. Generally, towing streamers at greater depth reduces sea state noise in the survey data. Seismic streamers, however, are typically towed at shallower depths due to concerns about streamer ghost notches in the amplitude spectrum within the seismic frequency range.

FIG. 3B illustrates a potential survey configuration 300-B for reducing EM cross-talk and/or entanglement risks. Survey configuration 300-B illustrates survey vessel 109 towing all of the seismic streamers 113-S on only one side of the midline 110, while towing the EM source 104 on the other side of the midline 110. EM streamer 113-E (i.e., a streamer having only EM receivers) is illustrated as being towed on the same side of midline 110 as EM source 104, but it is also possible that EM receivers may be located on one or more additional streamers and/or on OBCN, in addition to, or in place of, EM streamer 113-E. It is currently believed that a survey configuration similar to survey configuration 300-B would require twice as many acquisition paths (similar to an interleaved survey design) as would be the case if the same number of seismic streamers were towed on both sides of the midline, as in survey configuration 300-A. Additionally, the asymmetric drag created by the towed streamers of this survey configuration may result in poor navigational control of survey vessel 109, poor steering control of seismic streamers 113-S and/or EM streamer 113-E, excess equipment wear, and/or high fuel costs. In some embodiments, EM streamer 113-E may be towed between 10 m and 200 m depth. In some embodiments, EM streamer 113-E may be towed between 50 m and 150 m depth. In some embodiments, EM streamer 113-E may be towed at about 100 m depth. Seismic streamers 113-S may be towed at the same or a different depth than EM streamer 113-E. To reduce EM cross-talk and/or entanglement risks, the EM source 104 is separated from seismic equipment by at least about 100 m. In some embodiments, the EM source 104 is separated from seismic equipment by at least about 300 m. For example, the separation between EM source 104 and either seismic source 103 or the nearest seismic streamer 113-S in survey configuration 300-B may be at least about 100 m, or at least about 300 m, or more.

Figure 4A:
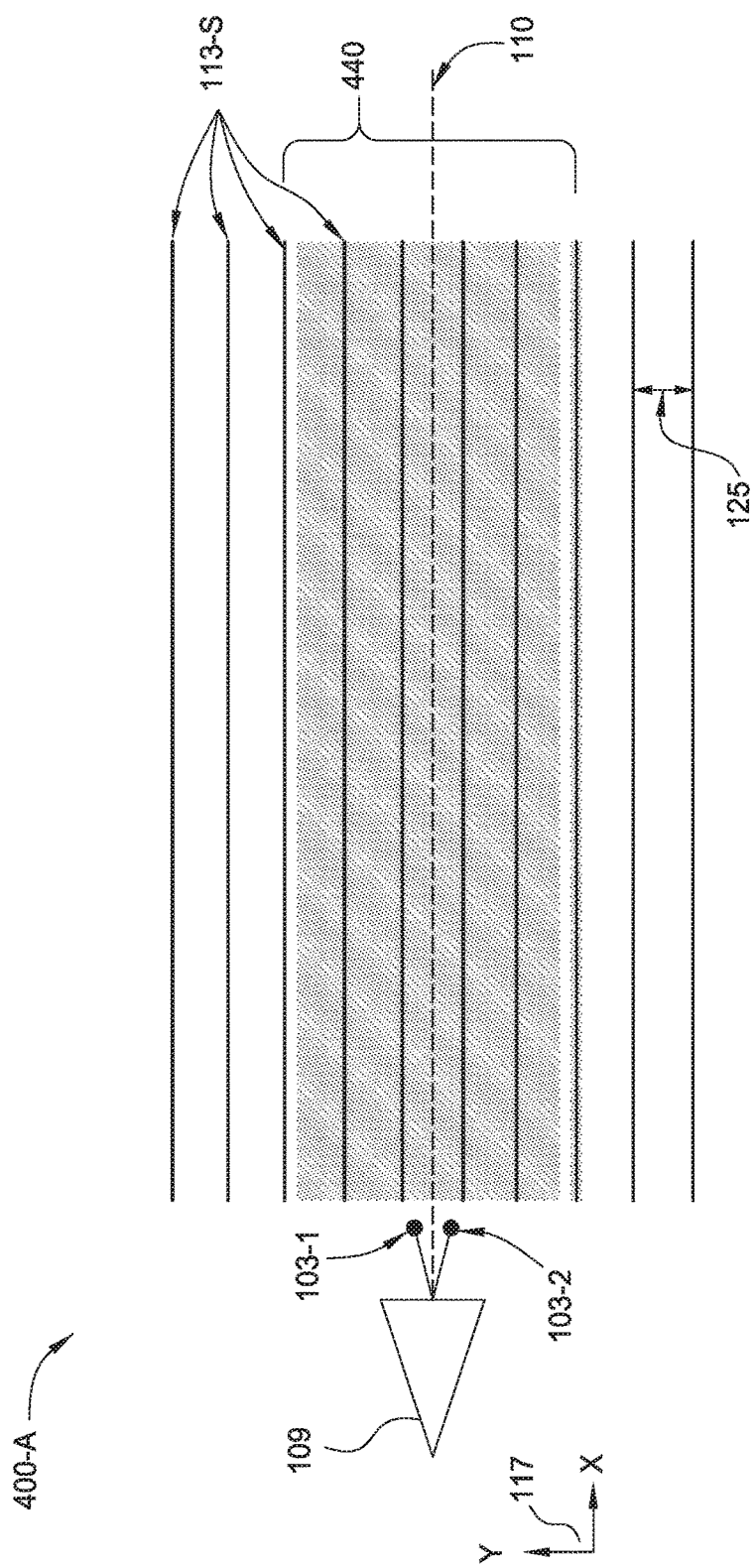
FIG. 4A is a top-view of a marine surveying system.

FIG. 4A illustrates a survey configuration 400-A. As illustrated, survey vessel 109 tows ten seismic streamers 113-S with nominal streamer separation 125 of about 100 m, resulting in a nominal distance between outer-most seismic streamers 113-S of about 900 m. The source array, illustrated as having two seismic source elements 103-1, 103-2 (i.e., dual-source shooting), may have a crossline extent of about 50 m. In some embodiments utilizing "dual-source" shooting, the crossline separation between seismic source elements is half the nominal streamer separation. Survey configuration 400-A would have a crossline CMP bin width of about 25 m, and the nominal sail-line separation to achieve uniform CMP coverage is 250 m. The crossline extent of uniform CMP coverage 440 is about 237.5 m on either side of midline 110. In some embodiments utilizing "dual-source" shooting, the crossline extent of uniform CMP coverage 440 is $$\text{Coverage} = 0.25 \times \text{streamer separation} \times ((2 \times N_{streamers}) - 1) \quad (6)$$

In the illustrated embodiment, the crossline extent of uniform CMP coverage 440 is 475 m. The sail-line separation is nominally larger than the crossline CMP coverage by one bin width:

$$\text{Sail-line separation} = \text{Coverage} + \text{Crossline bin width} \quad (7)$$

Therefore, for dual-source shooting, combining Equations (3) and (6):

$$\text{Sail-line separation} = \quad (8)$$
$$0.25 \times \text{streamer separation} \times ((2 \times N_{streamers}) - 1) +$$
$$0.25 \times \text{streamer separation} = 0.5 \times \text{streamer separation} \times N_{streamers}$$

In the illustrated embodiment, the maximum sail-line separation would be about 250 m.

Figure 4B:
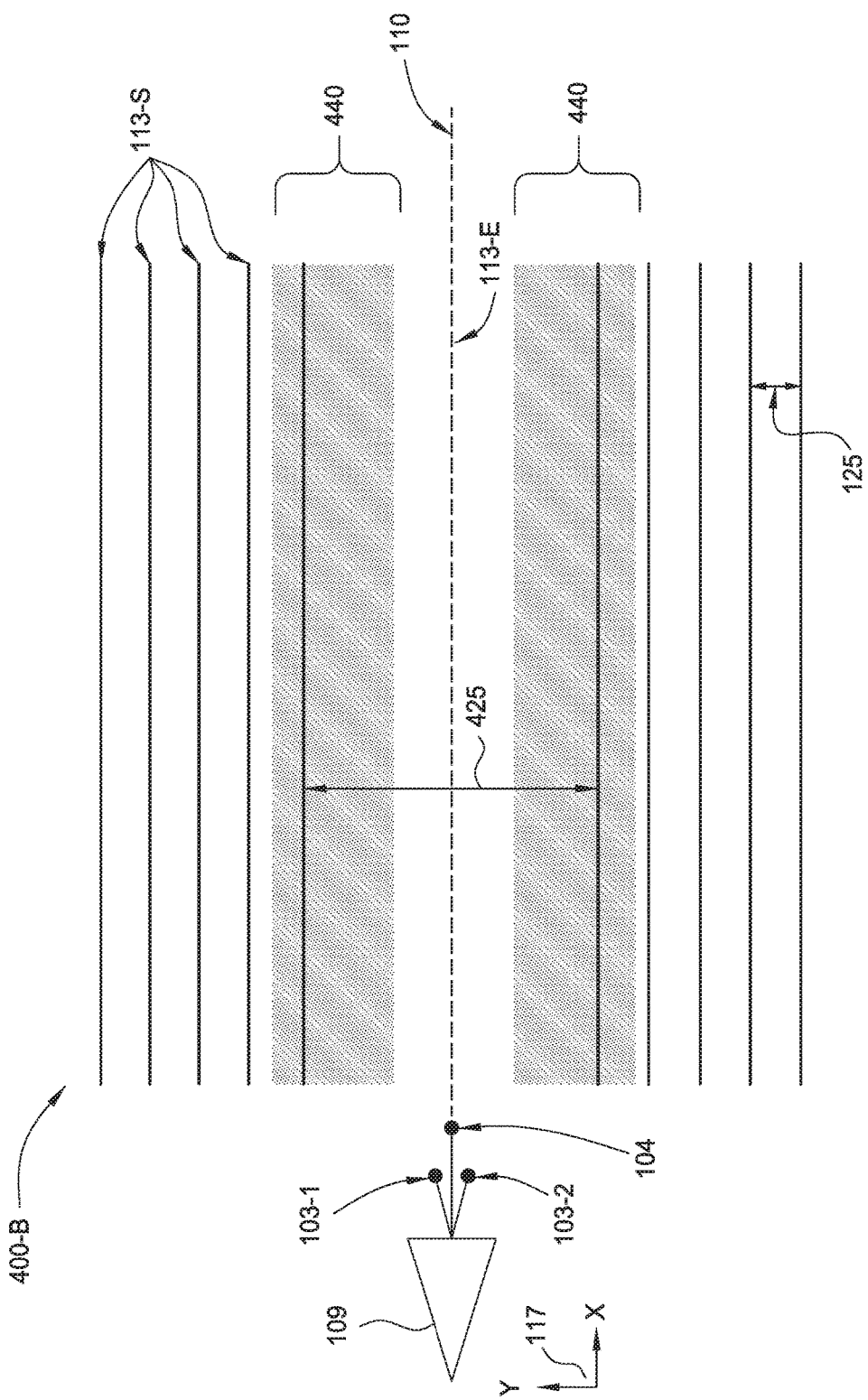
FIG. 4B is a top-view of another marine surveying system.

FIG. 4B illustrates a potential survey configuration 400-B for reducing EM cross-talk and/or entanglement risks, wherein the maximum sail-line separation to achieve uniform CMP coverage is unchanged relative to survey configuration 400-A. In FIG. 4B, a 600 m gap 425 is introduced between the inner-most two streamers. In general, the gap 425 is given by $$\text{Gap} = \text{streamer separation} \times ((0.5 \times N_{streamers}) + 1) \quad (9)$$

Using this formula to determine the gap 425 results in an efficient survey design, where the acquisition paths 220-a can be specified in a manner that avoids unnecessary "overlap" between uniform CMP coverage. Other than gap 425, the ten seismic streamers 113-S have nominal streamer separation 125 of about 100 m. Consequently, the nominal distance between outer-most seismic streamers 113-S would be about 1400 m. EM source 104 and EM streamer 113-E are deployed along the midline 110. (As previously discussed, it is also possible that EM receivers may be located on one or more additional streamers and/or on OBCN.) The crossline extent of the seismic source 103 remains about 50 m. The nominal crossline separation between either of the inner-most two seismic streamers 113-S and the EM source 104 (towed along the midline 110) or the EM streamer 113-E (illustrated as towed along the midline 110) would be about 300 m. The crossline extent of uniform CMP coverage 440 is now split into two zones on either side of midline 110, separated by a null zone:

$$\text{Coverage}_{zone} = 0.25 \times \text{streamer separation} \times ((2 \times N_{zone\ streamers}) - 1) \quad (10)$$

As illustrated, with five streamers in each zone, the crossline extent of uniform CMP coverage 440 is about 225 m in each zone. In other words, the crossline extent of uniform CMP coverage 440 is noncontiguous. In this example, the crossline extent of the null zone is the same as the crossline extent of each of the uniform CMP coverage zones, 250 m. If a sail-line separation of about 250 m is used, the crossline CMP bin width remains about 25 m. The near source-receiver offsets will, however, be increased significantly over survey configuration 400-A due to the increased crossline offset. To reduce EM cross-talk and/or entanglement risks, the separation between EM source 104 and either seismic source 103 or the nearest seismic streamer 113-S in survey configuration 400-B may be at least about 100 m, or at least about 300 m, or more. For example, the depth of tow for EM source 104 may adjusted to be significantly greater than the towing depth of either seismic source 103 or the nearest seismic streamer 113-S. The towing distance behind survey vessel 109 may also be adjusted.

Survey configuration 400-B may provide certain advantages over survey configurations 400-A and 300-B. For example, the seismic streamers 113-S in survey configuration 400-B will be separated from the EM source 104 and EM streamer 113-E by at least about 300 m, thereby reducing the entanglement risks over that of survey configuration 400-A. By distributing the same number of streamers on either side of midline 110, the towing of survey configuration 400-B will be more balanced (requiring less navigational compensation) than that of survey configuration 300-B. Likewise, with more balanced towing, the same number of seismic streamers 113-S may be towed in survey configuration 400-B as in survey configuration 400-A. However, survey configuration 400-B may present some challenges. For example, drag, and therefore streamer tension and associated noise, may increase as the width of the streamer spread increases.

Figure 5:
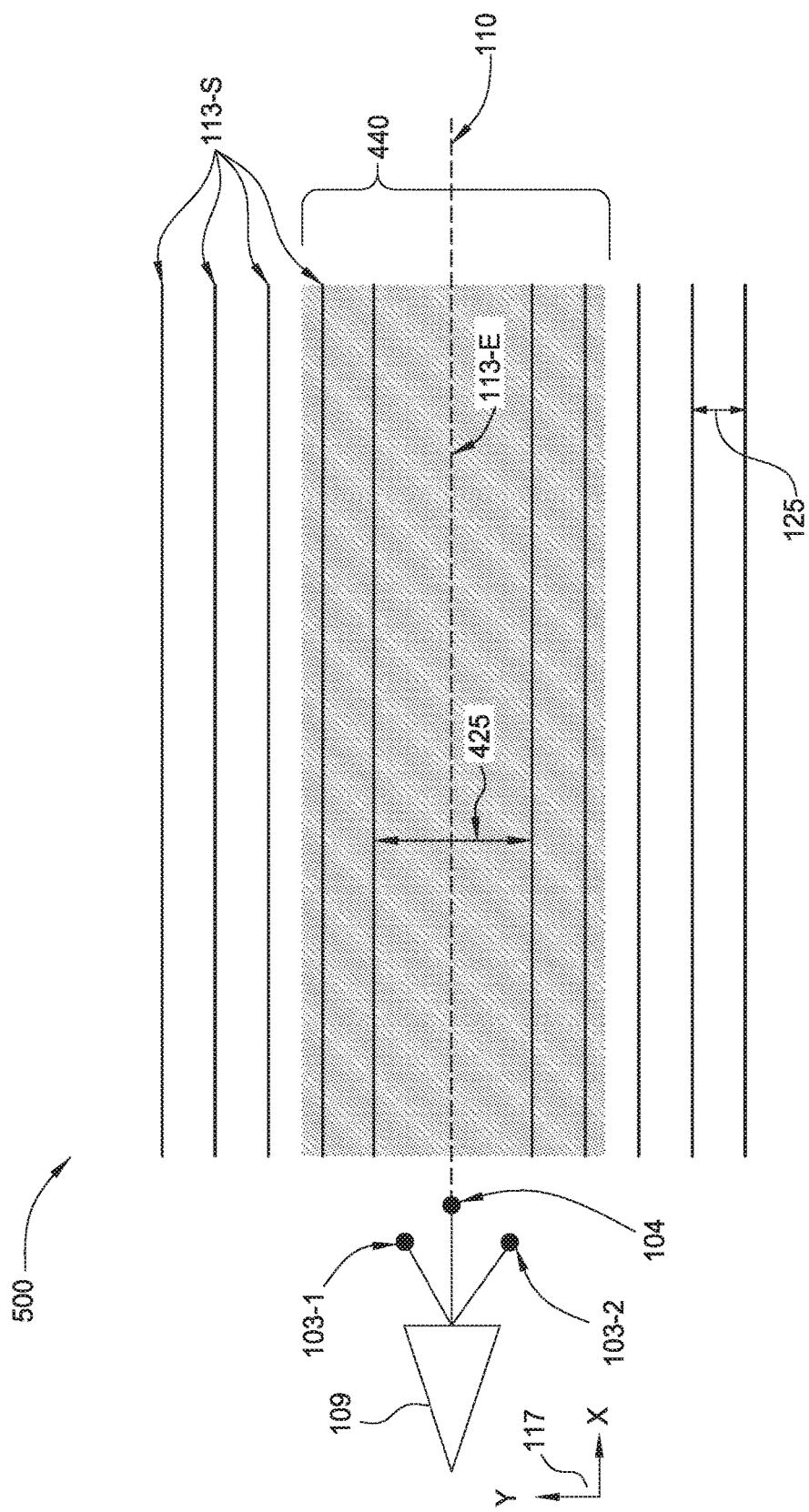
FIG. 5 is a top-view of a marine surveying system.

FIG. 5 illustrates a potential survey configuration 500 for reducing EM cross-talk and/or entanglement risks, wherein the gap 425 between the inner-most seismic streamers 113-S is smaller than in survey configuration 400-B, and the crossline extent of the seismic source 103 is larger than in survey configurations 300-AB, 400-AB. EM source 104 and EM streamer 113-E are deployed along the midline 110. (As previously discussed, it is also possible that EM receivers may be located on one or more additional streamers and/or on OBCN.) Consequently, the crossline separation between seismic source element 103-1 (or 103-2) and EM source 104 (or EM streamer 113-E) is increased. It is currently believed that survey configuration 500 would have a non-uniform CMP coverage 440. In other words, there would be an "excess" CMP coverage or "irregular CMP bin size" and/or "irregular CMP fold" when the crossline extent of the seismic source 103 is increased such that the seismic source elements 103-1,2 are outside the two inner-most seismic streamers 113-S. For example, a uniform CMP subline fold can be achieved by having a) uniform streamer separation 125 with the crossline extent of the seismic source 103 equal to half of the streamer separation 125, or b) uniform streamer separation 125 and crossline extent of the seismic source 103 outside the two outer-most seismic streamers 113-S. Survey configuration 500 illustrates a gap 425 of about 300 m between the inner-most seismic streamers 113-S, and a crossline separation of about 150 m between seismic source elements 103-1 and 103-2. Other than gap 425, the ten seismic streamers 113-S have nominal streamer separation 125 of about 100 m. Consequently, the nominal distance between the outer-most two streamers would be about 1100 m. The crossline separation between either of the inner-most seismic streamers 113-S and EM source 104 (or EM streamer 113-E) would be about 150 m. The crossline separation between seismic source element 103-1 (or 103-2) and EM source 104 (or EM streamer 113-E) would be about 75 m. To reduce EM cross-talk and/or entanglement risks, the separation between EM source 104 and either seismic source 103 or the nearest seismic streamer 113-S in survey configuration 500 may be at least about 100 m, or at least about 300 m, or more. For example, the depth of tow for EM source 104 may adjusted to be significantly greater than the towing depth of either seismic source 103 or the nearest seismic streamer 113-S. The towing distance behind survey vessel 109 may also be adjusted.

The CMP coverage 440 for survey configuration 500 is expected to be somewhat uniform, although the separation between various CMP sublines may vary somewhat according to various source separations, number of seismic streamers 113-S being towed, and the streamer separation 125. A larger separation between CMP sublines could have improved CMP fold by a combination of factors, such as a) Natural streamer feathering (i.e., the lateral deviation of a streamer away from the towing direction because of a water current), b) Streamer fanning, c) Using larger (irregular) CMP bin sizes ("Fresnel zone" concept), d) Using SWIM™ analysis and processing, e) Using compressive sensing-type recovery strategies (as discussed below). The smaller offset subline could have improved CMP fold by a combination of factors such as a) Natural streamer feathering, b) Interpolation/regularization in processing, c) Using SWIM™ analysis and processing, d) Using compressive sensing-type recovery strategies (as discussed below). It is expected that the maximum sail-line separation may increase to 300 m (from 250 m for survey configurations 400-A,B), so there is an expected gain in survey efficiency. The minimum crossline source-receiver separation has not changed from a conventional streamer configuration (e.g., 0.25×streamer separation for dual-source shooting).

Figure 6:
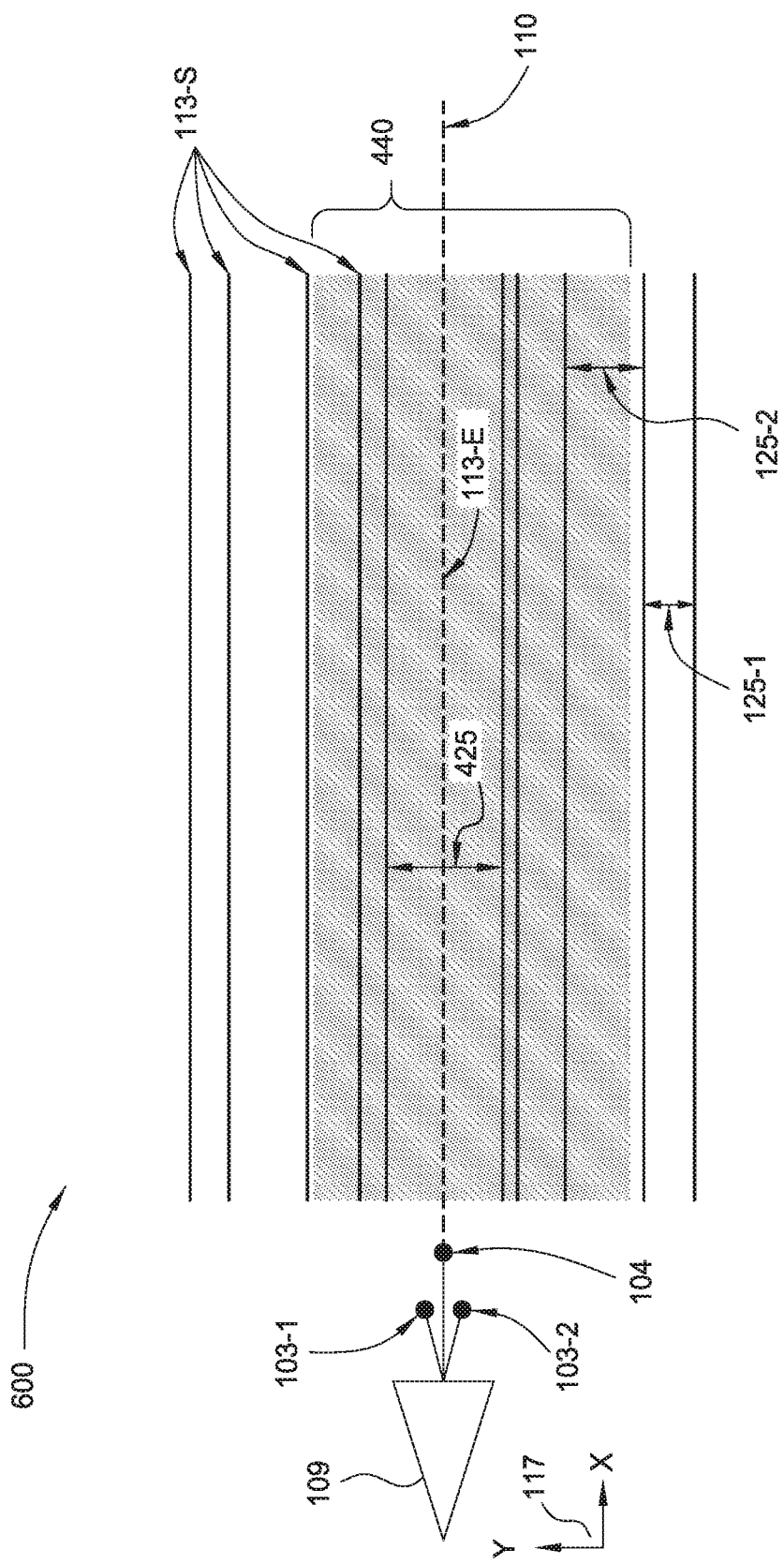
FIG. 6 is a top-view of a marine surveying system.

FIG. 6 illustrates a potential survey configuration 600 for reducing EM cross-talk and/or entanglement risks with irregular (non-uniform) seismic streamer separations 125. In some embodiments, compressive sensing principles may be used to strategically randomize the streamer separations 125 to facilitate the recovery of uniformly sampled data with sparse signal representation. The randomization may utilize, for example, an $L_1$-norm solver or other sparsity-promoting solver. Utilizing irregular streamer separation principles with a survey configuration for reducing EM cross-talk and/or entanglement risks, the largest streamer separation 125 would be assigned to the inner-most two seismic streamers 113-S. Consequently, the gap 425 between the inner-most two seismic streamers 113-S would equal the larges streamer separation 125. Such survey configurations might be complemented by streamer fanning and/or large seismic source crossline extent.

As illustrated, survey configuration 600 includes a seismic source 103 with crossline extent between source element 103-1 and 103-2 of about 50 m. The nominal distance between outer-most seismic streamers 113-S is about 1400 m. The gap 425 between the inner-most two seismic streamers 113-S is about 600 m. All other streamer separations (for example, streamer separations 125-1 and 125-2) are less than 600 m. EM source 104 and EM streamer 113-E are deployed along the midline 110. (As previously discussed, it is also possible that EM receivers may be located on one or more additional streamers and/or on OBCN.) The nominal crossline separation between either of the inner-most two seismic streamers 113-S and the EM source 104 or the EM streamer 113-E would be about 300 m. Since the nominal distance between the outer-most seismic streamers is unchanged from a survey configuration 400-B, the nominal sail-line separation is unchanged, and the CMP coverage is unchanged. As with survey configuration 500, increasing the crossline extent of the seismic source may create irregular crossline CMP coverage and/or irregular CMP subline separation, but regular data may be more robustly recovered using compressive sensing methods. To reduce EM cross-talk and/or entanglement risks, the separation between EM source 104 and either seismic source 103 or the nearest seismic streamer 113-S in survey configuration 600 may be at least about 100 m, or at least about 300 m, or more. For example, the depth of tow for EM source 104 may be adjusted to be significantly greater than the towing depth of either seismic source 103 or the nearest seismic streamer 113-S. The towing distance behind survey vessel 109 may also be adjusted.

In each survey configuration 300-AB, 400-AB, 500, and 600, seismic sources may include one or more towed marine vibrators and/or air guns; and survey design may include race-track, anti-parallel, herringbone, and/or interleaved to facilitate 3D seismic data regularization. In each survey configuration 300-AB, 400-AB, 500 with otherwise uniform streamer separation 125 (not including the gap 425), the streamer separation between the outer-most seismic streamers and the next-most-outer seismic streamers may be larger than the other (uniform) streamer separations 125 to facilitate 3D seismic data regularization. Likewise, in survey configuration 600, streamer separation 125-1 between the outer-most seismic streamer and the next-most-outer seismic streamer may be less than the gap 425, but larger than the other (irregular) streamer separations 125.

Survey configuration 400-A illustrates seismic source 103 between the two inner-most seismic streamers 113-S and with crossline extent given by:

$$\text{Crossline separation}_{seismic\ source} = 0.5 \times \text{streamer separation} \tag{11}$$

Similarly, survey configuration 600 illustrates source 103 between the two inner-most seismic streamers 113-S. Although survey configuration 600 illustrates irregular streamer separations, based on the separation of the seismic source elements (e.g., 0.25×streamer separation for dual-source shooting), a CMP binning grid may be defined to be equivalent to that of survey configuration 400-A (having uniform streamer separation). Thus, the CMP bin width is given by:

$$\text{Crossline bin width}_{dual\ source} = 0.25 \times \text{streamer separation} \tag{12}$$

for such dual-source shooting. Alternatively, a complex mathematical approach known as "compressive sensing" (or "compressed sensing") may be utilized to bin the data on a CMP binning grid where the CMP bin width is $$\text{Crossline bin width}_{dual\ source} = 0.25 \times \text{separation of closest adjacent pair of streamers} \tag{13}$$

for such dual-source shooting.

Figure 7B:
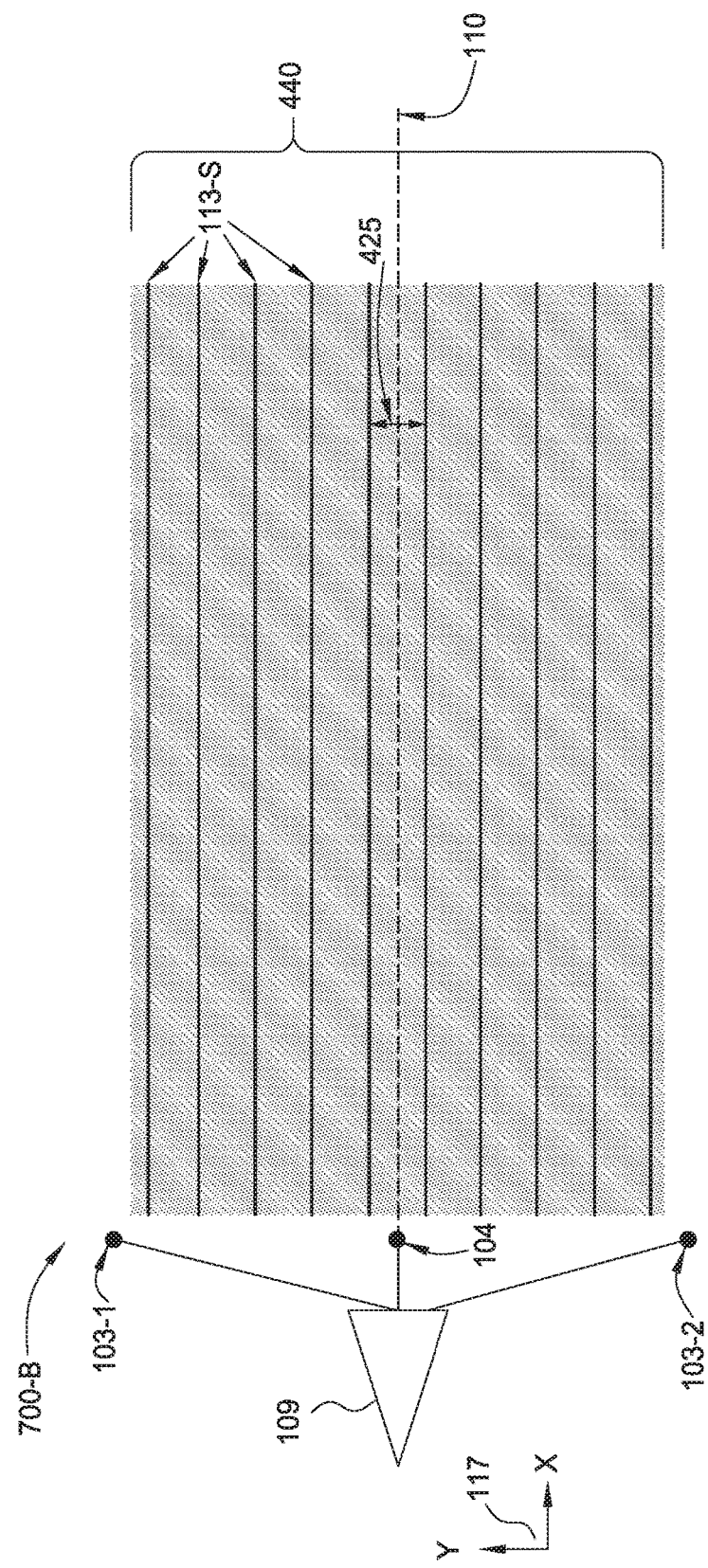
FIG. 7B is a top-view of another marine surveying system.

FIGS. 7A and 7B illustrate potential survey configurations 700-A and 700-B for reducing EM cross-talk and/or entanglement risks by increasing the crossline extent of seismic source 103. As illustrated by survey configurations 400-A, when the crossline extent of the seismic source is less than streamer separation between the two inner-most seismic streamers (e.g., gap 425), the maximum sail-line separation is given by:

$$\text{Sail-line separation} = 0.5 \times N_{streamers} \times \text{streamer separation} \tag{14}$$

In some embodiments, the crossline extent of the seismic source may be greater than the gap 425. When the crossline extent of the seismic source increases, the maximum sail-line separation increases. For example, in survey configuration 700-A, the crossline extent of the seismic source is greater than the crossline distance between the inner-most two streamers. In survey configuration 700-B, the crossline extent of the seismic source is greater than the crossline distance between the outer-most two streamers. For configurations wherein the seismic source elements 103-1,2 are outside (at least) the inner-most two streamers, the CMP bin width doubles, resulting in a loss of spatial resolution. For example, in the case of dual-source shooting, the CMP bin width changes from Equation (11) to:

$$\text{Crossline bin width}_{dual\ source} = (0.5 \times \text{streamer separation}) \tag{15}$$

In this example, the maximum sail-line separation is given by:

$$\text{Sail-line separation} = 1.0 \times N_{streamers} \times \text{streamer separation} \tag{16}$$

double that for survey configuration 400-A. By increasing the sail-line separation, fewer acquisition paths 220-a will be required to cover the entire survey area. This gain in efficiency recognizes a trade-off in a reduction of resolution. To reduce EM cross-talk and/or entanglement risks, the separation between EM source 104 and either seismic source 103 or the nearest seismic streamer 113-S in survey configuration 700 may be at least about 100 m, or at least about 300 m, or more. For example, the depth of tow for EM source 104 may adjusted to be significantly greater than the towing depth of either seismic source 103 or the nearest seismic streamer 113-S. The towing distance behind survey vessel 109 may also be adjusted.

The survey configurations discussed above have the following properties:

TABLE 1

| survey configuration | number of adjacent seismic streamers | adjacent streamer separation | inner-most streamer gap | distance between outer-most streamers | crossline extent of seismic source | crossline extent of uniform CMP coverage | crossline separation between adjacent acquisition paths | crossline CMP bin width |
|---|---|---|---|---|---|---|---|---|
| 300-A | 4 | 100 m | 100 m | 300 m | 50 m | 175 m | 200 m | 25 m |
| 300-B | 4 | 100 m | 100 m | 300 m | 50 m | 175 m | 200 m | 25 m |
| 400-A | 10 | 100 m | 100 m | 900 m | 50 m | 475 m | 500 m | 25 m |
| 400-B | 10 | 100 m | 600 m | 1400 m | 50 m | 275 m (plus null zone) | alternating: 250 m, 750 m | 25 m |
| 500 | 10 | 100 m | 300 m | 1100 m | 150 m | 475 m | 500 m | 25 m |
| 600 | 10 | irregular | no more than 200 m | 900 m | 50 m | 475 m | 500 m | 25 m (uninterpolated) |
| 700-A | 10 | 100 m | 100 m | 900 m | 150+ m | 475 m to 950 m | 500 m to 1000 m | 25 m to 50 m |
| 700-B | 10 | 100 m | 100 m | 900 m | 900+ m | | | |

Figure 8A:
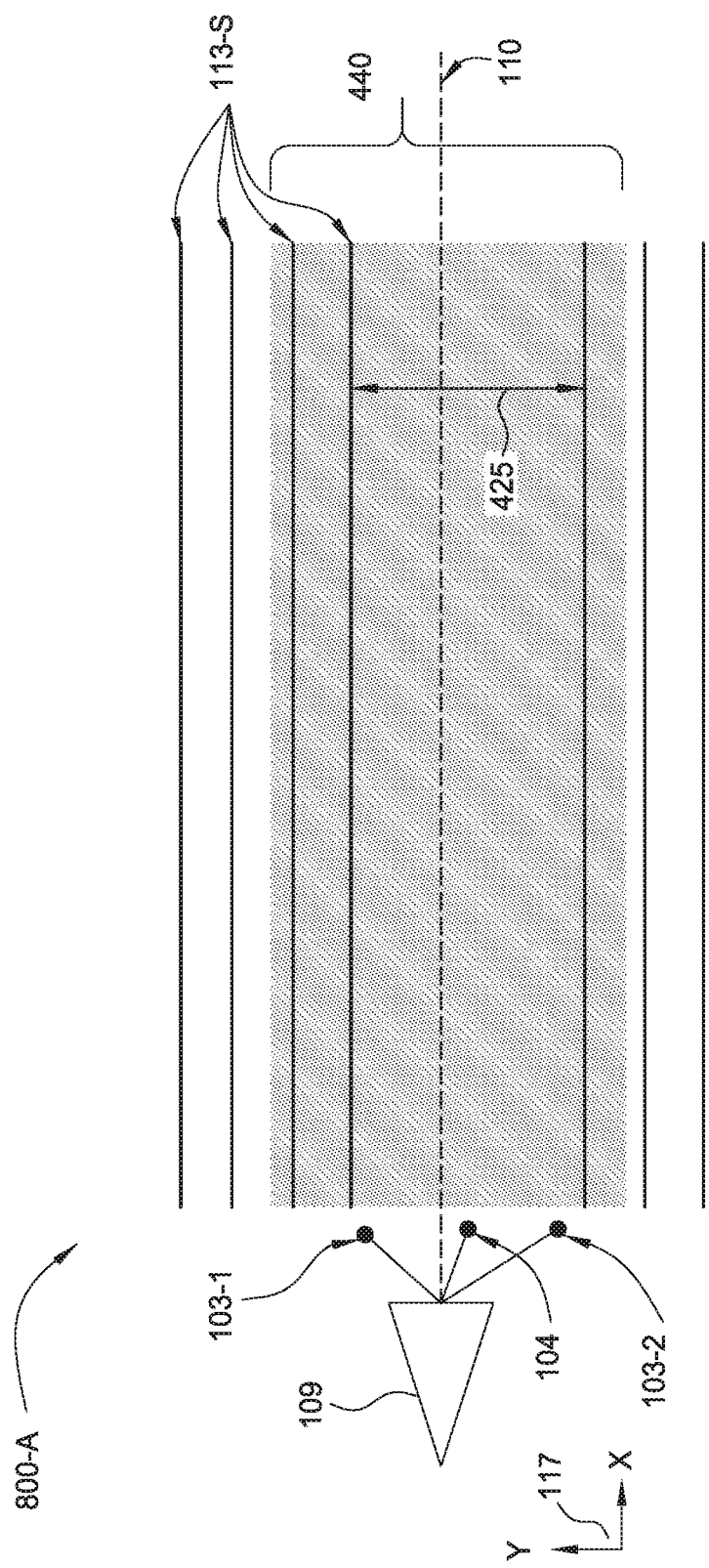
FIG. 8A is a top-view of a marine surveying system.
Figure 8B:
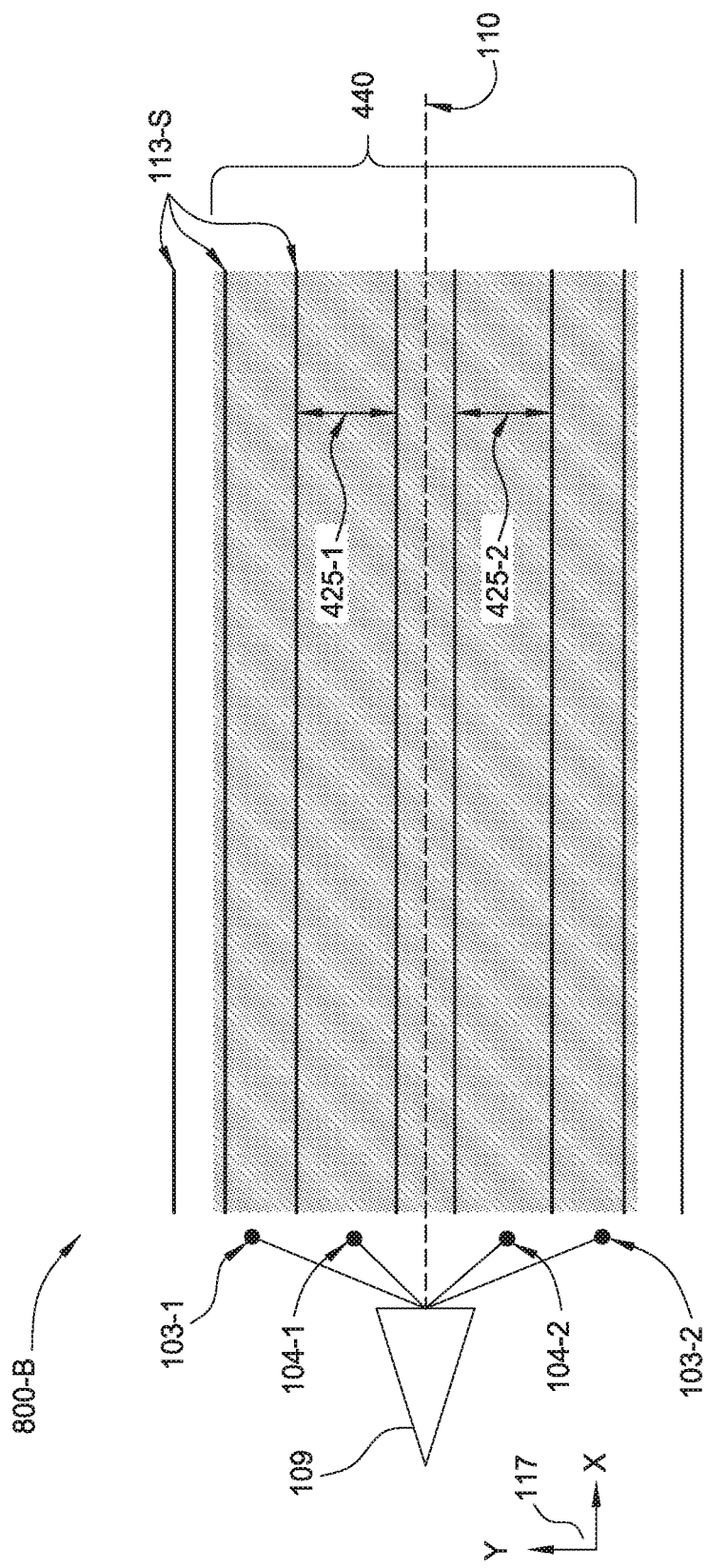
FIG. 8B is a top-view of another marine surveying system.

It should be apparent that a number of other survey configurations are possible while still reducing risks of EM cross-talk and/or entanglement, and likewise maintaining uniform CMP coverage during the survey. In each such survey configuration, the offset between the EM source 104 and the nearest seismic equipment (i.e., seismic source 103 or seismic streamer 113-S) is at least 100 m, and may be at least 300 m or more. For example, FIG. 8A illustrates a survey configuration 800-A wherein the EM source 104 is towed off of the midline 110. However, unlike survey configuration 300-B, the seismic streamers 113-S are distributed on either side of midline 110. Such distribution of seismic streamers 113-S may be beneficial for navigation and fuel utilization. As another example, FIG. 8B illustrates a survey configuration 800-B wherein multiple EM sources 104-1,2 are utilized. While the EM sources 104-1,2 are both closer to the midline 110 than the two outermost seismic streamers 113-S, neither is closer to the midline 110 than the two innermost seismic streamers 113-S. Two gaps 425-1,2 are created to accommodate the two EM sources 104-1,2.

Figure 9:
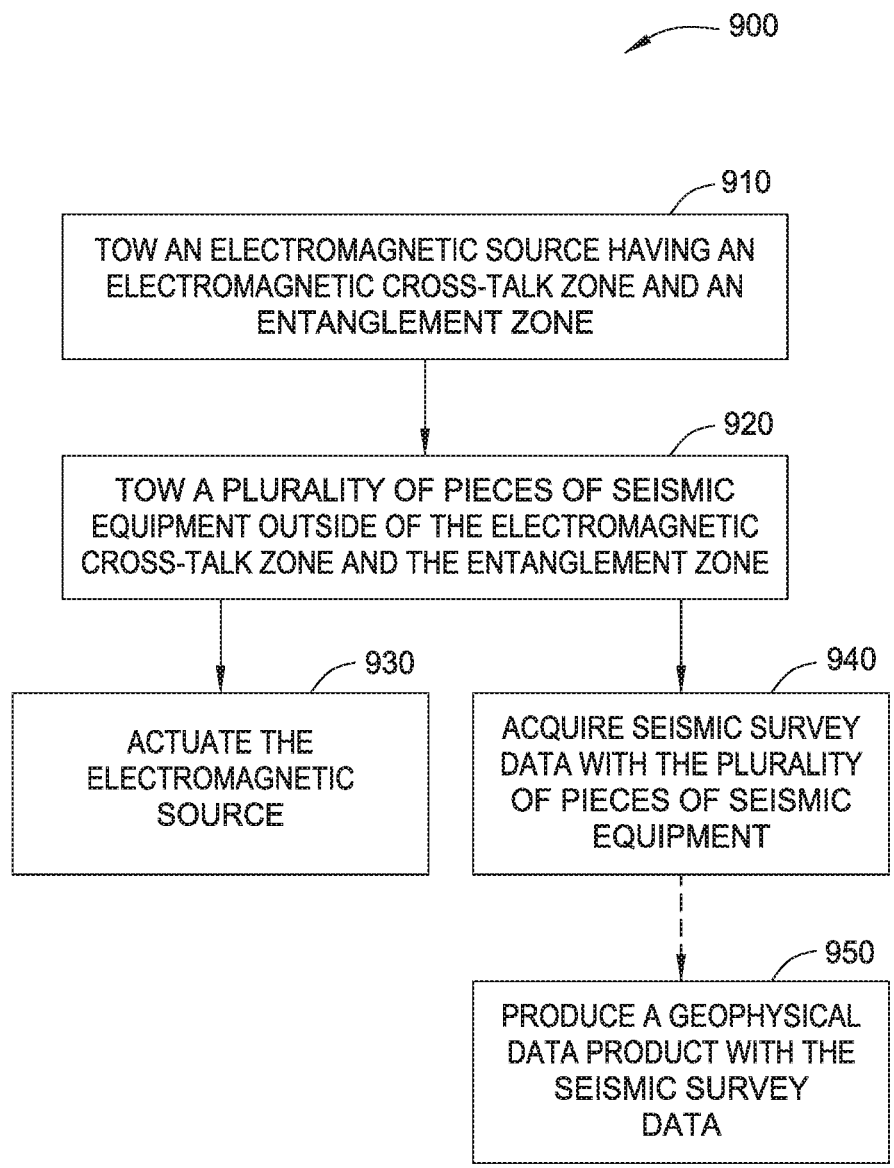
FIG. 9 is a flow chart of a method.

During operation, marine surveying may entail usage of one or more of the previously discussed survey configurations. As illustrated in FIG. 9, a method of marine surveying 900 may begin at step 910 wherein an EM source is towed by a survey vessel. The EM source has an EM cross-talk zone and an entanglement zone. At step 920, seismic equipment is towed outside of the EM cross-talk zone and the entanglement zone. In some operations, at least one piece of the seismic equipment is towed by the same survey vessel that tows the EM source. The seismic equipment may be towed with a variety of configurations while remaining outside of the EM cross-talk zone and the entanglement zone, for example, the configurations discussed above. At step 930, the EM source is actuated. At the same time, at step 940, seismic survey data is acquired with the seismic equipment. In some operations, the seismic survey data is used at step 950 to produce a geophysical data product.

In accordance with a number of embodiments of the present disclosure, a geophysical data product may be produced. The geophysical data product may include, for example, marine survey data, seismic survey data, electromagnetic survey data, common midpoint data, trace data, binning data, fold data, location data, water property data, pressure data, water particle motion data, resistivity data, combined seismic and electromagnetic survey data, etc. Geophysical data, such as data previously collected by seismic receivers, EM receivers, depth sensors, location sensors, etc., may be obtained (e.g., retrieved from a data library) and may be recorded on a non-transitory, tangible computer-readable medium. The geophysical data product may be produced by processing the geophysical data offshore (i.e. by equipment on a vessel) or onshore (i.e. at a facility on land) either within the United States or in another country. If the geophysical data product is produced offshore or in another country, it may be imported onshore to a facility in the United States. In some instances, once onshore in the United States, geophysical analysis, including further data processing, may be performed on the geophysical data product. In some instances, geophysical analysis may be performed on the geophysical data product offshore.

While the foregoing is directed to embodiments of the present invention, other and further embodiments of the invention may be devised without departing from the basic scope thereof, and the scope thereof is determined by the claims that follow.

The invention claimed is:

1. A method of marine surveying comprising:
towing an electromagnetic source having an electromagnetic cross-talk zone and an entanglement zone with a survey vessel;
towing a plurality of pieces of seismic equipment with the survey vessel, wherein each piece of seismic equipment is towed outside of the electromagnetic cross-talk zone and the entanglement zone;
actuating the electromagnetic source; and
while actuating the electromagnetic source, acquiring seismic survey data with the plurality of pieces of seismic equipment, wherein:
the plurality of pieces of seismic equipment comprises a port seismic streamer spread and a starboard seismic streamer spread,
the port seismic streamer spread comprises a first plurality of seismic streamers having receivers thereon,
the starboard seismic streamer spread comprises a second plurality of seismic streamers having receivers thereon,
all of the receivers on each of the seismic streamers are seismic receivers,
the port seismic streamer spread is towed to a port side of the electromagnetic source, and
the starboard seismic streamer spread is towed to a starboard side of the electromagnetic source.

2. The method of claim 1, wherein the electromagnetic source is towed along a midline of the survey vessel.

3. The method of claim 1, wherein a nominal crossline extent of the port seismic streamer spread is equal to a nominal crossline extent of the starboard seismic streamer spread.

4. The method of claim 1, wherein the port seismic streamer spread comprises the same number of seismic streamers as the starboard seismic streamer spread.

5. The method of claim 1, wherein each adjacent pair of seismic streamers in the port seismic streamer spread are separated by a nominal crossline streamer separation, and each adjacent pair of seismic streamers in the starboard seismic streamer spread are separated by the nominal crossline streamer separation.

6. The method of claim 1, wherein
the port seismic streamer spread is separated from the starboard seismic streamer spread by a nominal crossline gap, and
the nominal crossline gap is at least three-times a least of each nominal crossline streamer separation between adjacent streamer pairs.

7. The method of claim 1, wherein the plurality of pieces of seismic equipment comprises a seismic source having at least two seismic source elements.

8. The method of claim 7, wherein the electromagnetic source is towed deeper than the seismic source.

9. The method of claim 8, wherein a difference in nominal towing depth between the electromagnetic source and the seismic source is at least as large as a nominal inline separation between the electromagnetic source and the seismic source.

10. The method of claim 7, wherein
the seismic source comprises a port seismic source element and a starboard seismic source element,
the port seismic source element is towed to the port side of the electromagnetic source, and
the starboard seismic source element is towed to the starboard side of the electromagnetic source.

11. The method of claim 10, wherein the electromagnetic source is towed along a midline of the survey vessel.

12. The method of claim 10, wherein
the port seismic streamer spread is towed to a port side of the port seismic source element, and
the starboard seismic streamer spread is towed to a starboard side of starboard seismic source element.

13. The method of claim 12, wherein a crossline separation between the port seismic source element and the starboard seismic source element is greater than a least of each nominal crossline streamer separation between adjacent streamer pairs.

14. The method of claim 10, wherein
the port seismic streamer spread is separated from the starboard seismic streamer spread by a nominal crossline gap, and
a crossline separation between the port seismic source element and the starboard seismic source element is greater than the nominal crossline gap.

15. The method of claim 14, wherein the crossline separation between the port seismic source element and the starboard seismic source element is greater than a nominal crossline separation between a port-most streamer of the port seismic streamer spread and a starboard-most streamer of the starboard seismic streamer spread.

16. The method of claim 7, wherein
the electromagnetic source comprises a port electromagnetic source element and a starboard electromagnetic source element,
the port electromagnetic source element is towed to a port side of a midline of the survey vessel, and
the starboard electromagnetic source element is towed to a starboard side of the midline of the survey vessel.

17. The method of claim 16 wherein
the seismic source comprises a port seismic source element and a starboard seismic source element,
the port seismic source element is towed to a port side of the port electromagnetic source element, and
the starboard seismic source element is towed to a starboard side of the starboard electromagnetic source element.

18. The method of claim 1 further comprising producing a geophysical data product with the seismic survey data.

19. The method of claim 18, further comprising recording the geophysical data product on a non-transitory, tangible computer-readable medium.

20. The method of claim 18, further comprising performing geophysical analysis onshore on the geophysical data product.

* * * * *